United States Patent
Faugeron et al.

(10) Patent No.: US 11,678,669 B2
(45) Date of Patent: Jun. 20, 2023

(54) PROCESS FOR ELICITING A PLANT BY MEANS OF EDIBLE MACROSCOPIC FUNGAL EXTRACTS

(71) Applicants: UNIVERSITE DE LIMOGES, Limoges (FR); COVERTIS, Limoges (FR)

(72) Inventors: Céline Faugeron, Saint-Just-le-Martel (FR); Vincent Gloaguen, Limoges (FR); Cédric Astier, Vicq-sur-Breuilh (FR); Charlotte Moine, Limoges (FR)

(73) Assignee: UNIVERSITE DE LIMOGES, Limoges (FR)

( * ) Notice: Subject to any disclaimer, the term of this patent is extended or adjusted under 35 U.S.C. 154(b) by 676 days.

(21) Appl. No.: 16/342,107

(22) PCT Filed: Oct. 13, 2017

(86) PCT No.: PCT/EP2017/076174
§ 371 (c)(1),
(2) Date: Apr. 15, 2019

(87) PCT Pub. No.: WO2018/069497
PCT Pub. Date: Apr. 19, 2018

(65) Prior Publication Data
US 2019/0254288 A1  Aug. 22, 2019

(30) Foreign Application Priority Data
Oct. 14, 2016 (FR) ...................... 1660000

(51) Int. Cl.
| | | |
|---|---|---|
| C07F 15/00 | (2006.01) | |
| A61K 31/282 | (2006.01) | |
| A61K 41/00 | (2020.01) | |
| A01N 65/00 | (2009.01) | |
| A01N 25/04 | (2006.01) | |
| A01N 63/50 | (2020.01) | |

(52) U.S. Cl.
CPC ............ *A01N 65/00* (2013.01); *A01N 25/04* (2013.01); *A01N 63/50* (2020.01)

(58) Field of Classification Search
CPC ........ A01N 65/00; A01N 25/04; A01N 63/50; A61N 63/50
USPC ........................................................ 504/117
See application file for complete search history.

(56) References Cited

U.S. PATENT DOCUMENTS

| 6,326,016 | B2 | 12/2001 | Moesinger | |
|---|---|---|---|---|
| 6,387,847 | B1 | 5/2002 | Yvin et al. | |
| 6,770,303 | B1 | 8/2004 | Fritig et al. | |
| 7,556,946 | B2 * | 7/2009 | Versali | A61Q 19/00 435/101 |
| 2001/0014324 | A1 | 8/2001 | Moesinger | |
| 2004/0023924 | A1 | 2/2004 | Lienart | |
| 2006/0178270 | A1 | 8/2006 | Chevolot et al. | |
| 2011/0136758 | A1 * | 6/2011 | Hiromoto | A61P 31/04 435/171 |

FOREIGN PATENT DOCUMENTS

| EP | 1001678 | B1 | 4/2003 | |
|---|---|---|---|---|
| JP | H02-243697 | A | 9/1990 | |
| JP | 2001-503733 | A | 3/2001 | |
| JP | 2004-509906 | A | 4/2004 | |
| JP | 2008-228676 | A | 10/2008 | |
| JP | 2011-140463 | A | 7/2011 | |
| WO | 97/45018 | A1 | 12/1997 | |
| WO | 99/03346 | A1 | 1/1999 | |
| WO | 99/53761 | A1 | 10/1999 | |
| WO | 92/26037 | A2 | 4/2002 | |
| WO | WO-03068824 | A1 * | 8/2003 | ........... C08B 37/003 |
| WO | 2004/082380 | A1 | 9/2004 | |
| WO | 2004/082381 | A1 | 9/2004 | |
| WO | 2007/042557 | A2 | 4/2007 | |

OTHER PUBLICATIONS

Reference Terms of Button mushroom obtained online from www.sciencedaily.com (Year: 2021).*
Synytsya et al. Carbohydrate Polymers 76 (2009) 548-556 (Year: 2009).*
Stam et al. Protein Engineering, Design & Selection vol. 19 No. 12 pp. 555-562, 2006 (Year: 2006).*
Szwengiel et al. Carbohydrate Polymers 146 (2016) 310-319. (Year: 2016).*
Smits et al., "Differential regulation of cell wall biogenesis during growth and development in yeast", Microbiology, 2001, pp. 781-794, vol. 147.
Desaki et al., "Contamination of Chitin Oligosaccharides in a Laminarioligosaccharide Preparation Can Cause a Confused Interpretation of its Elicitor Activity", Bioscience, Biotechnology and Biochemistry,, 2011, pp. 362-363, vol. 75, No. 2.
Basse et al., "Elicitors and Suppressors of the Defense Response in Tomato Cells", The Journal of Biological Chemistry, 1992, pp. 10258-10265, vol. 267, No. 15.
Ozeretskovskaya et al.,"Oligosaccharins as regulatory molecules of plants", Russian Journal of Plant Physiology, 1996, pp. 648-655, vol. 43, No. 5.
WPI/Derwent Publication, Oligosaccharide Preparation Hydrolysis Beta Glucan Contain Water Soluble Polysaccharide Solvent Precipitation, 1990, week 90-338512, XP-002061732.

(Continued)

*Primary Examiner* — Mina Haghighatian
*Assistant Examiner* — Janice Y Silverman
(74) *Attorney, Agent, or Firm* — Nixon & Vanderhye

(57) ABSTRACT

Process for conferring a protection against a pathogen upon a plant by elicitation by an aqueous composition, the active agents of which are extracted from edible fungi (parasol mushroom, pleurotus, button mushroom). An alkaline extraction is carried out, then an enzymatic hydrolysis, to obtain a fraction less than 100 kDa. The process consists in spraying the aerial parts of the plant with the composition obtained in this way; this thereby acts to combat cryptogamic diseases of plants such as vines, fruit trees, vegetable crops and cereals.

7 Claims, 3 Drawing Sheets

(56) References Cited

OTHER PUBLICATIONS

NG, "Mushroom Proteins Related to Host Defense", International Journal of Medicinal Mushrooms, 2005, pp. 221-236, vol. 7.
International Search Report and Written Opinion, dated Nov. 7, 2017, from corresponding PCT application No. PCT/EP2017/076174.
FR Search Report and Written Opinion, dated Apr. 28, 2017, from corresponding 1660000.

* cited by examiner

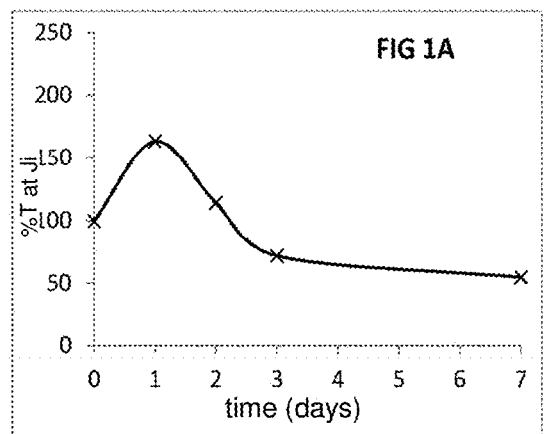
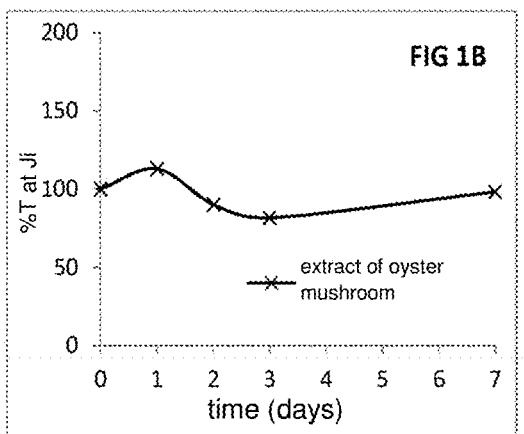
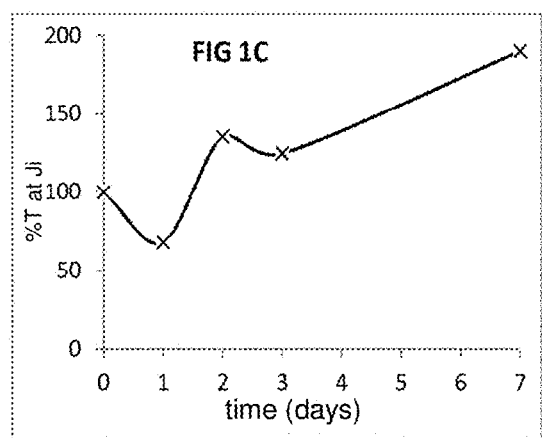
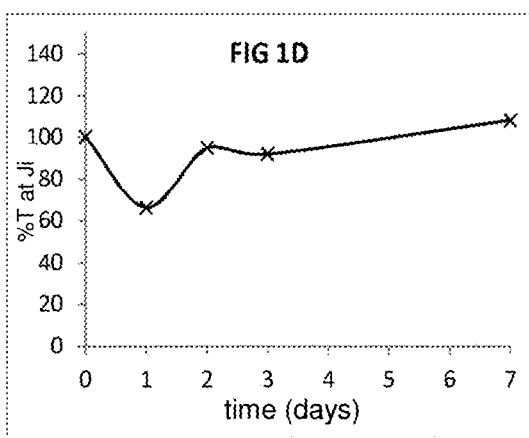
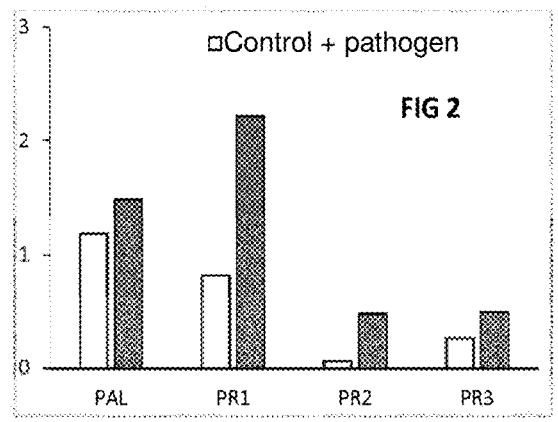
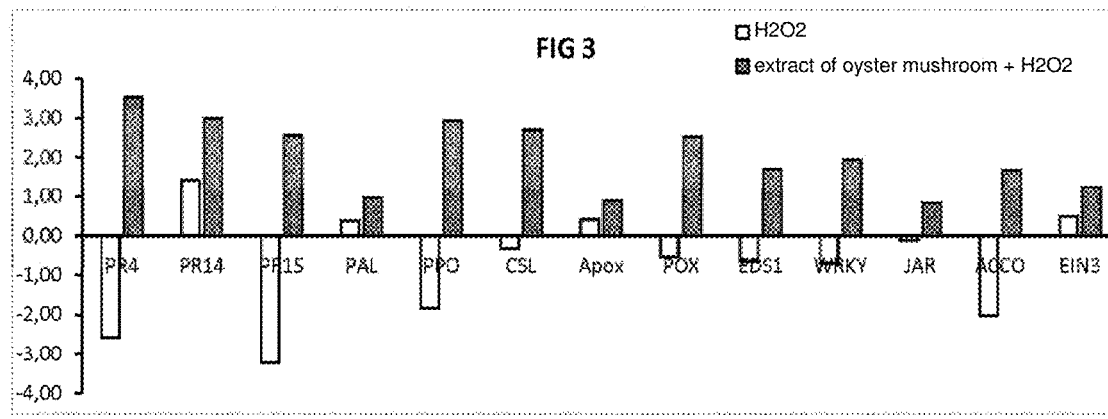

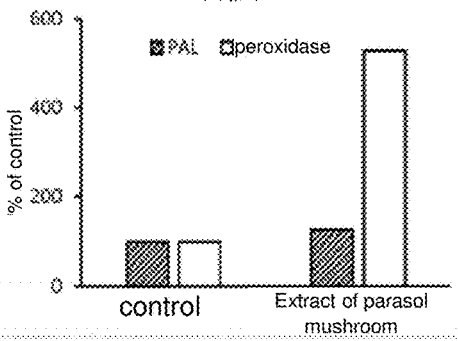
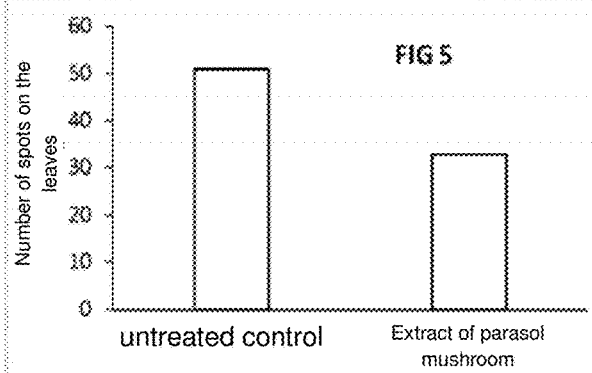
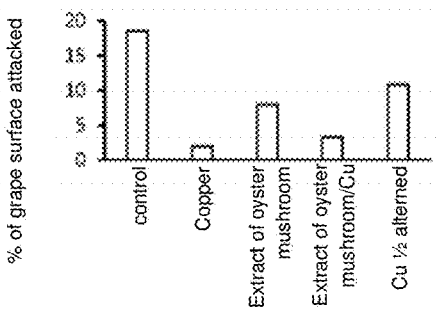
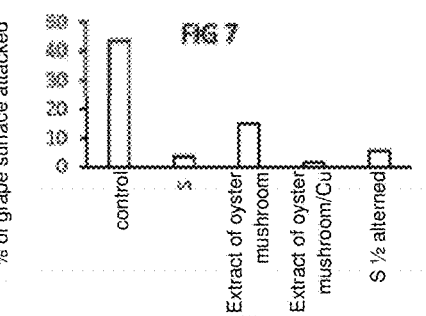

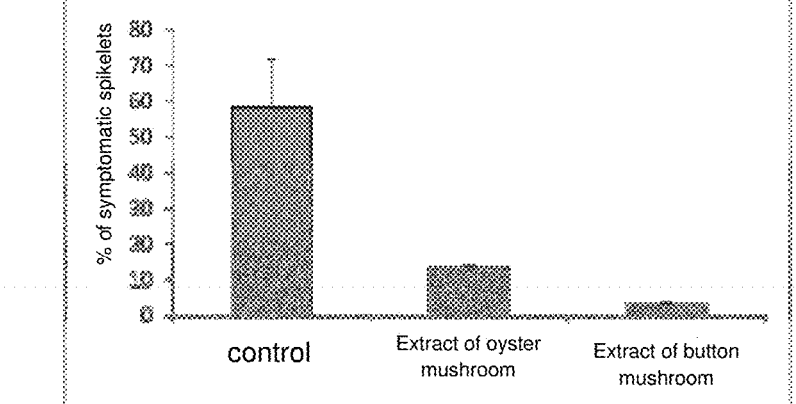
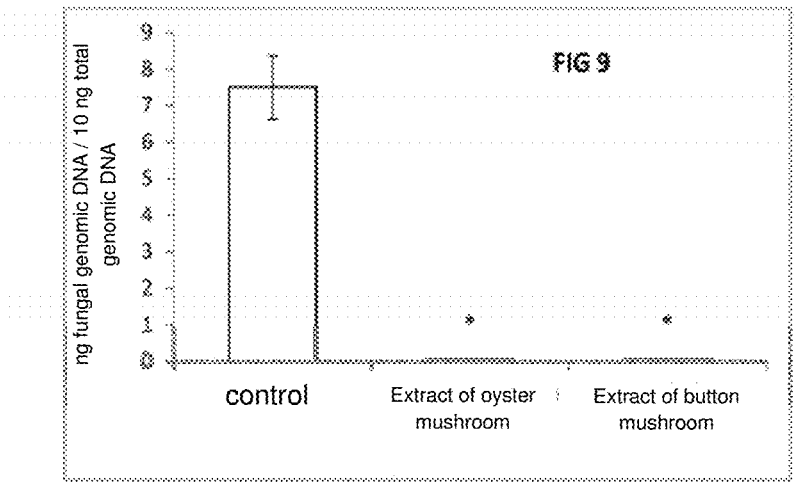
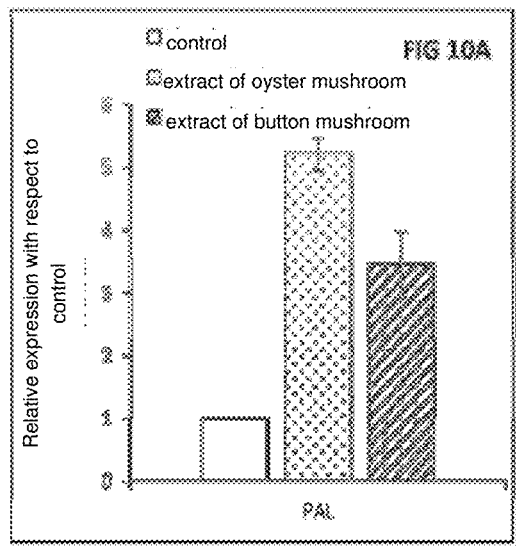
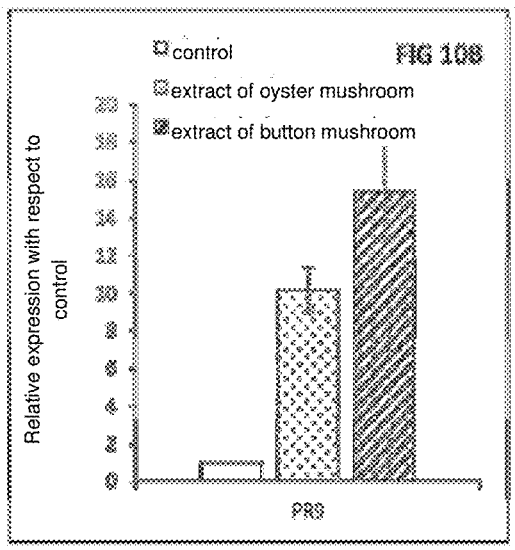

PROCESS FOR ELICITING A PLANT BY MEANS OF EDIBLE MACROSCOPIC FUNGAL EXTRACTS

BACKGROUND OF THE INVENTION

Field of the Invention

The object of the invention is a method for stimulating the natural defenses of plants of the kind that are agronomically useful. These include, in particular, vines, fruit trees, such as apple trees, vegetable plants, particularly tomatoes and potatoes, or cereals, such as wheat.

Description of the Related Art

The stimulation of the natural defenses of plants is a very current problem, which has been, and still is, the subject of much research. In fact, plants are able to develop physiological or metabolic responses allowing them to defend themselves during attacks by pathogens such as: viruses, bacteria, fungi or insects. These natural defenses are of several types:
  strengthening pre-existing cellular barriers by stimulating the lignification of plant cell walls;
  the synthesis by the plant of compounds with antibiotic activity such as phytoalexins;
  the synthesis of enzymatic proteins that can attack the cell wall of pathogens such as chitinases or glucanases.

These natural defenses may be triggered by eliciting molecules, even at low concentrations. These elicitors include, for example, oligosaccharides, in particular oligogalacturonates, oligoglucans or oligochitins. These molecules may be produced in the context of an attack by a pathogen and are perceived by the attacked plant as a signal to which it responds by stimulating its natural defenses.

An exogenous supply of a solution of elicitor(s), for example in the form of a spray, can also stimulate the natural defenses of the treated plant and thus reduce the symptoms of diseases caused by these pathogens.

The international application WO 2007/042557 relates to plant protection compositions intended to stimulate the natural defenses of plants, in particular grapevines, tomatoes and potatoes, thus making it possible to control plant diseases, in particular powdery mildew and downy mildew. This application describes a composition characterized in that it contains as active ingredient, at least one oligosaccharide secreted by, or obtained from, a strain of plant pathogenic or non-pathogenic fungus. Nevertheless, the only fungi described in this application are plant pathogenic fungi.

The international application WO 2004/082381 describes a method for the stimulation of natural defenses of monocotyledons (cereals) and dicotyledons (grapevine, tobacco, potato and tomato) in which an effective amount of at least one of the products of the group of pentosans is applied to the leaves or seeds of the treated plant in the form of a composition, wherein the concentration of at least one of the products of the group is between 50 mg/L and 5000 mg/L. The method uses optionally hydrolyzed arabinoxylans and xylans, but the applicant of the present application wishes to avoid elicitors of this type, which offer low efficiencies for the protection of treated plants.

The international application WO 2004/082380 describes a method for the potentiation and stimulation of the natural defenses of monocotyledons and dicotyledons, especially vines, potatoes and tomatoes. The active ingredient used in the method described is xanthan obtained from a bacterial process, yet the applicant wishes to avoid elicitors from sources involving pathogenic organisms.

The international application WO 1999/053761 describes the use of one or more antifungal and/or antibacterial and/or antiviral compounds to amplify (potentiate) the responses of plant defenses to pathogenic agents, obtained by the isolated use of eliciting compounds. The antifungal and/or antibacterial and/or antiviral compounds (referred to as "B compounds" in the aforementioned patent, and used as potentiators) may be, for example, phosphorous acid derivatives, while the eliciting compounds (referred to as "A compounds" in the aforementioned patent) may be, for example, oligosaccharides or oligopectins that may be extracted from algae or yeasts. In this document, the lists given for the compounds to be used for the elicitors A, cite non-phytotoxic products; but the applicant considers that compounds B, in addition to being synthetic compounds, may exhibit phytotoxicity and that, if they are excluded, there is no reason to suppose that the results reported for non-phytotoxic elicitors would actually be achieved.

In all the documents of the prior art mentioned above, an improvement of the defenses of the plants to be treated is certainly obtained compared to a control. But the applicant of the present application considers that the methods described are unsatisfactory because the applicant wishes there to be no phytotoxicity of the active ingredient, and that the reduction of the need for further treatment is not carried out by plant pathogenic fungi or synthetic fungicides.

International application WO 9745018 relates to an agent for inducing resistance against phytopathogenic microorganisms in plants. This agent is a biomass extract derived from plant non-pathogenic microorganisms. In one embodiment described, the agent is a fungal biomass component, derived from biotechnological waste resulting from a fermentation method; wherein this agent may be a mushroom. But the applicant considers that this document is not relevant to the prior art of the invention covered by the present application, since the composition used is from a microbial biomass.

The international application WO 99-03346, which gave rise to the European patent 1001678, describes a method of conferring acquired systemic resistance on an agronomically useful plant, i.e. an immunity with respect to an pathogenic agent, an immunity that results when the plant is in contact with the pathogen by potentiation of natural defenses; in this method, the plant is treated prior to contact with the pathogen, particularly by foliar application, of a liquid composition comprising an oligo-ß-1,3-glucan composed of 3 to 250 saccharinic units. The concentration of the liquid composition in oligo-ß-1,3-glucans is less than the concentration at which the oligo-ß-1,3-glucan acts as an elicitor, i.e. at which it directly induces the defense reactions. It is stated that oligo-ß-1,3-glucans may be extracted from various fungi, a list of which is provided in the aforementioned European patent 1001678 (see passage page 4, line 54 to page 5, line 4). Example 1 indicates that the ß-1,3-glucans used are extracted from a bacterium; Example 2 indicates that the raw material is a marine algae; Example 3 indicates that the raw material is zymosan; Example 4 indicates that ß-1,3-glucan is lichenan, which is a hydrolyzate extracted from the fungus *Cetraria islandica*. However, the applicant of the present application proposes the preferential use of non-phytotoxic extracts of macroscopic fungi rather than extracts of algae or microorganisms. Furthermore, it is known to those skilled in the art that the molecular organization of the macroscopic mushroom cellular wall comprises a large number of layers forming a skeletal structure in which mannoproteins bound through ß-1,6-glucans to ß-1,3-glucans are found; wherein this complex skeletal structure is enhanced by a small amount of chitin covalently bound to the deepest ß-1,3-glucans of the said structure (see, in particular, the publication G. J. Smits, H. Van den Ende, F. M. Klis, Microbiology Vol 147,781-794, 2001). Therefore, the applicant of the present application proposes, in an innovative way and through the use of fungi as sources, the use of oligoglucan and oligo-chitin/oligo-chitosan complexes (publication Y. Desaki, I. Otomo, N. Shibuya; Bioscience, Biotechnology and Biochemistry, Vol. 75, Iss. 2, 362-363, 2011) and/or mannoproteins (publication C. W. Bass, K. Bock, T. Bolier; The Journal of Biological Chemistry, Vol. 267, 135. 15, 10258-10265. 1992), in order to take advantage of the synergy of eliciting effects between these different families of molecules.

The prior art also includes WO 02/26037, which proposes the use of xyloglucan polymers and oligomers as phytosanitary and biofertilizing products; WO 2007/042557, which proposes compositions for phytopharmaceutical application intended to stimulate the natural defenses of plants, in particular of the vine, tomato and potato, thus making it possible to fight against plant diseases; the journal publication O. L. Ozeretskovskaya and L. G. Romenskaya entitled "Oligosaccharins as regulatory molecules of plants", Russian Journal of Plant Physiology, Moscow, RU, Vol. 43, No. 5, WPI/Derwent Publication (week 90-338512) (Thompson Scientific, London)), which deals with the partial hydrolysis of polysaccharides containing 1-3-β-glucan structures, and finally the publication "International Journal of Medicinal Mushrooms", vol. 7, no. 1-2, 2005, pages 221-236, entitled "Mushroom proteins related to host defense".

SUMMARY OF THE INVENTION

The object of the applicant is, therefore, to propose a new method of stimulating the natural defenses of plants and, in particular, an active method for tomato, potato, vine, wheat and apple tree. The method according to the invention offers an improvement of the defenses compared to an untreated control with a reduction in the number of successive treatments to be performed; wherein the composition to be used is obtained by a method which results in a non-phytotoxic product and the use of this composition leads to a reduction, or even a suppression, in the need for additional treatments by synthetic fungicides.

This composition is obtained from the parasol mushroom, the oyster mushroom or the button mushroom; it therefore comprises a whole series of products extracted from the fungi used as raw material and in particular, as could be expected by the study of the prior art, ß-1,3-glucans. The composition obtained according to the invention corresponds to a particular formulation of the different products present, which makes it possible to obtain, upon its application to the plant to be treated, results that are superior to those obtained according to the prior using only ß-1,3-glucans. The tests carried out on the tomato show a 35% increase in the defense activities following treatment with the composition obtained by the method according to the invention; potato tests showed a 40% decrease in leaf stains due to late blight compared with an untreated control. The tests carried out on the vine show a 100% increase in the defense activity following treatment according to the invention compared to an untreated control. This demonstrates the interest and the patentability of the method, which proposes the implementation of the new composition according to the invention.

As a guide only and without this constituting any limitation as to the composition used in the method according to the invention, it is possible to indicate, in a preliminary manner, that the composition according to the invention generally comprises a protein level of about 10% relative to the dry matter, a total sugar level of about 75% relative to the dry matter, and a monosaccharide composition of about 70 to 76 mol % glucose, about 13 mol % galactose, and about 11 mol % mannose; while its level of ß-glucans is generally about 54% relative to the dry matter, while its polysaccharide fraction is about 40 to 75% of the dry extract, wherein this fraction has a molecular mass greater than 10 kDa. It is all of these characteristics that makes it possible, when applying the composition used by the method according to the invention to the plants, in order to obtain new and particularly interesting treatment results.

The object of the present invention is, therefore, a method suitable for conferring protection against a pathogen by elicitation on an agronomically useful or ornamental plant, wherein the method consists in treating at least some of the aerial parts of the plant with an aqueous composition, the essential active agents of which are obtained by extraction from fungi, characterized in that the active agents of the composition are obtained:

a) by subjecting a powder of macroscopic fungi to an alkaline extraction and then neutralizing the extract obtained before proceeding to its filtration;

b) diluting the filtered extract and subjecting it to a glycosidase at between 10 to 65° C., wherein the hydrolysis thus performed is stopped by inactivating the enzyme at a temperature above 65° C.;

c) subjecting the hydrolyzate obtained to a filtration step to isolate an active fraction of molecular weight less than 100 kDa.

According to one embodiment, the method according to the invention is characterized in that the alkaline extraction step is carried out at a temperature of between 20 and 100° C., while maintaining under stirring a suspension of 5 to 15 parts by weight of mushroom powder in an aqueous alkaline solution having a pH greater than 10; wherein the neutralization of the solution obtained by the alkaline extraction step may be carried out with an organic or inorganic acid, with the precipitate obtained being removed; wherein the product obtained after neutralization of the alkaline extract may be subjected to several filtrations in order to separate the acid salt(s) and the simple sugars from the liquid phase.

In one embodiment of the method according to the invention, the enzymatic hydrolysis effected with the glycosidase, is maintained for 24 hours with stirring.

In one embodiment of the method according to the invention, the edible fungi subjected to an alkaline extraction, are species selected from the group formed by oyster mushrooms, parasol mushrooms and button mushrooms.

In one embodiment of the method according to the invention, the aerial parts of the plants to be treated are sprayed with a composition having a pH of between 4 and 8, wherein the concentration of active agents is 1.5 to 4% by weight.

In one embodiment of the method according to the invention, the composition with which the aerial parts of the plant to be treated are sprayed, comprises a protein content of 5 to 15% by weight relative to its dry matter.

In one embodiment of the method according to the invention, the composition, with which the aerial parts of the plant to be treated are sprayed, comprises a total sugar content of 60 to 80% by weight relative to the dry matter.

In one embodiment of the method according to the invention, the composition with which the aerial parts of the plant to be treated are sprayed, has a monosaccharide formulation corresponding to a weight proportion of 38 to 50% glucose, 18 to 28% galactose, 20 to 30% mannose, and 0.5 to 4% glucosamine and/or acetylated glucosamine.

In one embodiment of the method according to the invention, the composition with which the aerial parts of the plant to be treated are sprayed, contains from 35 to 45% by weight of glucans relative to its dry matter.

In one embodiment of the method according to the invention, the composition with which the aerial parts of the plant to be treated are sprayed, contains 30 to 50% by weight of a dry matter, whose molecular mass is greater than 10 kDa.

In one embodiment of the method according to the invention, the method is associated with treatment of the aerial parts of the treated plant with a conventional phytosanitary agent applied simultaneously or sequentially or alternately.

In one embodiment of the method according to the invention, the method constitutes a preventive treatment against fungal diseases, in particular those selected from the group formed by diseases of the vine, fruit trees, vegetable crops and cereals, and especially against downy mildew (*Plasmopara viticola*), powdery mildew (*Erysiphe necator*), gray mold (*Botrytis cinerea*) of the vine, late blight (*Phytophthora infestans*) of the potato, yellow rust (*Puccinia striiformis*), Septoria leaf blotch (*Septoria* sp.), *Fusarium* head blight (*Fusarium graminearum*) of wheat, and apple scab (*Venturia inaequalis*).

In one embodiment of the method according to the invention, the implementation is carried out at the early vegetative stage and/or at the adult and reproductive vegetative stages.

In one embodiment of the method according to the invention, the implementation is carried out at repeated time intervals, as often as necessary, and preferably every eight to fifteen days.

The object of the invention is also a composition for implementing the method previously defined, characterized in that it is obtained:
a) by subjecting a powder of edible macroscopic fungi to an alkaline extraction and then neutralizing the extract obtained before proceeding to its filtration;
b) diluting the filtered extract and subjecting it to a glycosidase at 10 to 65° C., wherein the hydrolysis thus performed is stopped by inactivating the enzyme at a temperature above 65° C.;
c) subjecting the obtained hydrolyzate to a filtration step to isolate an active fraction of molecular weight less than 100 kDa.

In a preferred embodiment, the composition according to the invention is characterized in that the alkaline extraction step is carried out at a temperature of between 20 and 100° C., while maintaining stirring of a suspension of 5 to 15 parts by weight of mushroom powder in an alkaline aqueous solution having a pH greater than 10.

In one embodiment of the composition according to the invention, the product obtained after neutralization of the alkaline extract is subjected to several filtrations in order to separate the acid salt(s) and the simple sugars from the liquid phase.

In one embodiment, the composition according to the invention is obtained by performing the enzymatic hydrolysis with the glycosidase for 24 hours with stirring.

In one embodiment of the composition according to the invention, the edible fungi subjected to an alkaline extraction, are species chosen from the group formed by oyster mushrooms, parasol mushrooms and button mushrooms.

In one embodiment of the composition according to the invention, the composition concentration of the active agent is 150 to 400 mg/L.

In one embodiment, the composition according to the invention comprises a protein content of 5 to 15% by weight relative to its dry matter.

In one embodiment, the composition according to the invention comprises a total sugar content of 60 to 80% by weight relative to its dry matter.

In one embodiment, the composition according to the invention has a monosaccharide formulation corresponding to a weight proportion of 38 to 50% glucose, 18 to 28% galactose, 20 to 30% mannose and 0.5 to 4% glucosamine and/or acetylated glucosamine.

In one embodiment, the composition according to the invention contains from 35 to 45% by weight of glucans relative to its dry matter.

In one embodiment, the composition according to the invention contains from 30 to 50% by weight of a dry matter, whose molecular mass is greater than 10 kDa.

In one embodiment, the composition according to the invention contains at least one compatible formulation agent.

In one embodiment, the composition according to the invention comprises at least one anti-phytopathogenic agent chosen from the group consisting of a fungicidal agent, an antibacterial agent, an antiviral agent, a pesticidal agent, and a biocontrol agent.

In one embodiment, the composition according to the invention contains at least one nutrient for simultaneous application to plants.

Three examples of manufacture of dry extracts of three compositions according to the invention and seven examples of implementation of the treatment method according to the invention are given below to illustrate the embodiment and implementation of the invention. These examples are, of course, provided for purely illustrative and non-limiting purposes.

BRIEF DESCRIPTION OF THE DRAWINGS

The invention will be described in connection with the attached drawing figures, in which:

FIG. 1 shows the evolution of phenylalanine ammonia lyase and peroxidase activities in roots and aerial parts of tomato plants sprayed with oyster mushroom extract. The data are expressed in % of the untreated control. The representations given in FIG. 1A-1D are as follows:
FIG. 1A: roots PAL activity,
FIG. 1 B: aerial parts PAL activity,
FIG. 1 C: root peroxidase activity, and
FIG. 1D: aerial parts peroxidase activity;
FIG. 2 shows the expression of the genes associated with the defense reactions (PAL: phenylalanine ammonia lyase, PR1, PR2 and PR3: Pathogenesis Related) in the leaves of tomato plants which have been treated with either an aqueous solution at 0.5% by weight of the ethoxylated sorbitan ester surfactant sold under the brand name TWEEN™ (control), either by the extract of parasol mushroom and then inoculated with *Botrytis cinerea*;

FIG. 3 shows the expression of the genes associated with the defense reactions at the level of apple tree leaves that have been pre-treated with the extract of oyster mushroom (J=0) and then treated with $H_2O_2$ (J=1);

FIG. 4 shows the phenylalanine ammonia lyase and peroxidase activities in the vine leaves treated by spraying with the parasol mushroom extract or not (control), and then inoculated with *Botrytis cinerea*. The data are expressed in % of the untreated control;

FIG. 5 shows the count of the spots appearing on the foliage of the potato plants which were or were not pre-treated with the extract of parasol mushroom (count of Jul. 4, 2014);

FIG. 6 shows the attacked grape surface (%) on vines after treatment (or not) with the oyster mushroom extract, as well as alternating with Bordeaux mixture (oyster mushroom extract/Cu);

FIG. 7 shows the grape surface attacked (%) by powdery mildew on vines (Chardonnay grape variety) treated (or not) with the oyster mushroom extract, as well as alternately with the above-mentioned "Thiovit" product (oyster mushroom extract/S);

FIG. 8 shows the symptom notation at 10 days of post-inoculation as symptomatic spikelets;

FIG. 9 represents the quantification of the fungal biomass expressed in ng of *F. graminearum* genomic DNA for 10 ng of total genomic DNA (plant+fungus) determined by quantitative PCR; and FIGS. 10A and 10B show the relative expression of the PAL (A) and PR9 (B) genes in *B. distachyon* ears pretreated with the oyster mushroom extract (dot pattern bars), or the button mushroom extract (hatched bars) and inoculated with *F. graminearum*, then harvested 48 hours after post-inoculation.

DESCRIPTION OF THE PREFERRED EMBODIMENTS

EXAMPLES

Example 1

100 g of dried and finely crushed parasol mushrooms (<1 mm) are incorporated in 1 liter of 8% sodium hydroxide with added 0.1% sodium borohydride. The suspension is stirred at room temperature for 24 hours. By adding a solution of glacial acetic acid, the medium is brought to pH 6.5. Glucanase is added at a rate of 0.1% w/V and the mixture is stirred at room temperature for 20 hours. The hydrolyzate is centrifuged and then filtered. The solution is then ultrafiltered in a tangential ultrafiltration system of the Pellicon mini type marketed by MILLIPORE equipped with a 100 kDa porosity membrane. The permeate obtained is then subjected to a membrane ultrafiltration of 1 kDa to desalt the solution. The solution is concentrated and freeze-dried. Thus, 7 g of a beige powder which constitutes the hydrolyzate EX1 is obtained.

Example 2

The raw material consists of the stems of mushroom *Pleurotus Ostreatus*. 200 g of oyster mushroom stems dried and finely ground (<1 mm) are dispersed in 2 L of 8% sodium hydroxide in the presence of 0.1% sodium borohydride. The extraction is carried out at room temperature for 24 hours, with mechanical stirring. By centrifugation, the insoluble fraction in $NaOH/NaBH_4$ is removed. The supernatant obtained is then neutralized with glacial acetic acid. The enzymatic system chosen is a ß-glucanase of *Aspergillus niger*, and added to the extract at 0.1% w/V. The whole is kept at room temperature for 3 hours. After denaturation at 100° C. for 10 min, the medium is centrifuged. The extract obtained is clarified by filtration. The resulting filtrate is subjected to microfiltration on a 0.1 μm porosity membrane and then on a 100 kDa membrane at a pressure of 1 bar. The system used is a tangential ultrafiltration system of the Pellicon mini type marketed by MILLIPORE.

This permeate is subjected to ultrafiltration on a 1 kDa membrane at a pressure of 2 bar to desalt the solution. This gives a retentate, which is then lyophilized. 15 g of a beige color powder constituting the EX2 extract are obtained.

Example 3

The raw material is button mushrooms. 100 g of dried and finely ground mushrooms (<1 mm) are dispersed in 1.5 L of 8% sodium hydroxide in the presence of 0.1% sodium borohydride. The extraction is carried out at room temperature for 24 hours, with magnetic stirring. The medium is then neutralized with acetic acid. After centrifugation, the supernatant is ultrafiltered at 1 kDa. ß-glucanase is added to the extract at 0.1 w/V. The mixture is stirred at room temperature for 24 hours. After denaturation at 100° C. for 10 min, the medium is centrifuged. This permeate is subjected to ultrafiltration on a membrane of 1 kDa. This gives a retentate, which is then lyophilized. 1 g of a beige color powder constituting the EX3 extract is obtained.

Example 4

Study showing stimulation of tomato defenses by extract of oyster mushroom EX2 (see FIG. 1A to 1D)

Marmande tomato plants grown under glass are used in 2-leaf stage (BBCH 12 102). The control batch consists of 24 plants distributed in 12 pots; likewise for the treated batch.

At t=0, each plant is treated with extract of oyster mushroom EX2 prepared at a concentration of 0.4 g/L, by foliar spray until runoff.

every day and for 7 days, plants are harvested, then separated into roots and aerial parts. The proteins are extracted in a suitable buffer and the enzymatic activities of phenylalanine ammonia lyase (PAL) and peroxidase are measured in the corresponding extracts. These activities are markers of the defense of plants: wherein the PAL is involved in the biosynthesis of phytoalexins, while peroxidase is involved in the formation of lignins constituting the wall of plant cells.

the specific enzymatic activities are expressed in the form of percentage of the value obtained for the treated plants relative to those of the untreated control plants.

FIG. 1 shows the evolution of phenylalanine ammonia lyase and peroxidase activities in roots and aerial parts of tomato plants sprayed with oyster mushroom extract. The data are expressed in % of the untreated control. The representations given in FIG. 1A-1D are as follows:

FIG. 1A: roots PAL activity
FIG. 1 B: aerial parts PAL activity
FIG. 1 C: root peroxidase activity
FIG. 1D: aerial parts peroxidase activity FIG. 1A-1D show that between one and two days after application of the extract, an increase in PAL activity is observed both at the roots and at the aerial parts, suggesting a systemic eliciting action of the oyster mushroom extract.

Regarding the peroxidase activity, it appears more intense between 3 and 7 days suggesting a later systemic response in this case.

Example 5

Study showing the stimulation of defenses in tomato by the extract of parasol mushroom in the presence of *Botrytis cinerea* (see FIG. 2)

Marmande tomato plants cultivated under glass are used at the 2-leaf stage (BBCH 12 102). Each batch of plants consists of 6 plants distributed in 3 pots.

At t=0, each plant is treated with extract of parasol mushroom EX1 in the form of a solution of 0.4 g/L by foliar spraying until runoff. The operation is renewed at t=2 days and t=5 days. Control plants are treated at the same periodicity but with an aqueous solution of ethoxylated sorbitan ester surfactant sold under the trademark TWEEN™ at 0.5% by weight.

At t=7 days, the plants are inoculated by the pathogenic fungus (*Botrytis cinerea*, strain UBOCC-A-101100 from the University of Western Brittany). A suspension of conidia (about $10^5$ conidia/mL) in aqueous ethoxylated sorbitan ester surfactant solution sold under the trademark TWEEN™ at 0.5% by weight, is deposited on several leaves in the form of regularly distributed droplets (100 µL/plant).

At t=14 days, the plants are harvested by taking leaf discs from each plant, which are frozen at −80° C. RNAs are extracted from the leaf samples.

The levels of expression of defense genes are quantified by Reverse Transcription Polymerase Chain Reaction (RT-PCR) amplification techniques using molecular probes specific to known and selected genes.

These genes correspond to that encoding the PAL and to several proteins of pathogenesis (PR proteins): PR1 (protein marker of the systemic response of plants), PR2 (glucanase type protein), and PR3 (chitinase type protein).

Gene expression levels are quantified by reference to a constitutive gene, that of tubulin. The results are expressed as a ratio between the level of expression of the gene related to defense processes and the level of expression of tubulin.

FIG. 2 shows the expression of the genes associated with the defense reactions (PAL: phenylalanine ammonia lyase, PR1, PR2 and PR3: Pathogenesis Related) in the leaves of tomato plants which have been treated with either an aqueous solution at 0.5% by weight of the ethoxylated sorbitan ester surfactant sold under the brand name TWEEN™ (control), either by the extract of parasol mushroom and then inoculated with *Botrytis cinerea*. The data are expressed as a ratio relative to the expression of the gene of tubulin.

The control exhibits an activation of the defense genes, particularly PAL and PR1 (PR3 and PR2 are less strongly activated) because of the presence of the pathogen (FIG. 2). However, pre-treatment with extract of parasol mushroom causes a stronger expression of the four defense genes studied, notably PR1, described as being associated with the systemic response of plants. Thus, the stimulating activity of the natural defenses is well proven for this extract.

Example 6

Study showing the stimulation of the defenses in the apple tree by the extract of oyster mushroom (see FIG. 3)

Apple trees (*Malus domestica*, Golden Delicious variety) were obtained under glass (20-25° C., natural period) from germination. They are used at the 4-6 leaf stage and arranged in blocks of 30 plants per test modality. Each block receives foliar spray treatment until runoff.

The oyster extract is applied at a concentration of 0.7 g/L of dry matter.

The blocks designated by "+$H_2O_2$blocs" are treated at J=1 (J means day) by spraying hydrogen peroxide to simulate an attack by a pathogen (patent WO 2011/161388). At J=3, leaf discs are taken from the plants. (10 discs per modality). After freezing in liquid nitrogen, the RNAs are extracted, and the expression of the defense genes (listed in Table 1) is measured by quantitative PCR using the qPFD® tool (aforementioned patent).

Relative expression levels were calculated with the so-called $2^{-\Delta\Delta Ct}$ method: they are relative expressions with respect to the WATER control, normalized by the geometric mean of the relative expressions of 3 reference genes (TuA, Actin, GAPDH). These relative expressions are transformed into log 2 to give the same weight to inductions and repressions of genes.

TABLE 1

Names of defense genes and defense pathways with which they are associated

| Type of defense | | Name of genes |
|---|---|---|
| Proteins PR | PR4 | Pathogenesis-related protein 4 (hevein-like) |
| | PR14 | Pathogenesis-related protein 14 (lipid transfer protein) |
| | PR15 | Pathogenesis-related protein 15 (oxalate oxidase) |
| Phenylpropanoid pathway | PAL | Phenylalanine ammonia-lyase |
| | PPO | Polyphenol oxidase |
| Cystein pathway | CSL | alliinase |
| Oxidative stress | Apox | Ascorbate peroxidase |
| | PDXO | Peroxidase |
| Salicylic acid pathway | EDS1 | Disease resistant protein 1 |
| | WRKY | WRKY transcription factor 30 |
| Jasmonic acid pathway | JAR | Jasmonate resistant 1 |
| Ethylene pathway | ACCO | 1-aminocyclopropene-1-carboxylate oxidase |
| | EIN3 | EIN3-binding F box protein 1 |

FIG. 3 shows the expression of the genes associated with the defense reactions at the level of apple tree leaves that have been pre-treated with the extract of oyster mushroom (J=0) and then treated with $H_2O_2$ (J=1). The data is expressed as a ratio with respect to the expression of reference genes (tubulin, Actin, etc.).

Pretreatment with oyster extract stimulates the expression of many genes associated with different defense pathways, such as the pathway of phenyl propanoids, oxidative stress signal, and hormonal signaling, which confirms the elicitor effect of the extract in increasing defense responses in the presence of pathogens.

Example 7

Study showing the stimulation of defenses in the vine by the extract of parasol mushroom in the presence of *Botrytis cinerea* (see FIG. 4)

Young vine plants (Cabernet Sauvignon grape variety) from nurseries are grown under glass (20-25° C., natural photoperiod). They are used when they have formed at least one branch bearing 6 well developed leaves (stage BBCH 16).

At t=0, the aerial shoots undergo a foliar spray treatment of the extract of parasol mushroom (1 spray of 200 µL of 0.4 g/L aqueous solution (dry matter) per spread leaf). The operation is renewed at t=2 days and t=5 days. The controls are not treated.

At t=7 days, all the plants are inoculated by the pathogenic fungus (*Botrytis cinerea*, UBOCC-A-101100 strain from the University of Western Brittany). A suspension of conidia (approximately $10^5$ conidia/mL) in an aqueous solution at 0.5% by weight of the ethoxylated sorbitan ester surfactant sold under the trademark TWEEN™ is deposited on several leaves in the form of regularly distributed droplets (1 000 µL/plant).

At t=14 days, the treated and inoculated leaves are harvested and protein extracted in a suitable buffer to measure the phenylalanine ammonia lyase (PAL) and peroxidase enzymatic activities in the corresponding extracts.

Specific enzyme activities are expressed as a percentage of the value obtained for the treated plants relative to those of the untreated control plants.

FIG. 4 shows the phenylalanine ammonia lyase and peroxidase activities in the vine leaves treated by spraying with the parasol mushroom extract or not (control), and then inoculated with *Botrytis cinerea*. The data are expressed in % of the untreated control.

Strong stimulation of PAL and peroxidase enzymatic activities are observed following pretreatment of vine plants by the extract of parasol mushroom; these activities are increased by 25% for PAL and multiplied by 5 for peroxidase.

Example 8

Effectiveness of the extract of parasol mushroom on the reduction of potato late blight symptoms in open-field trials:
A field trial was conducted on the potato (*Solanum tuberosum*, Ditta variant) in 2014 in Auchy-les-Mines (62, France) in order to determine the effectiveness of the parasol mushroom extract protection against late blight (*Phytophthora infestans*). The planting was carried out on Apr. 18, 2014.
On the experimental plot, 4 micro-plots per treatment condition were statistically distributed;
Five treatments were carried out with the extract of parasol mushroom: June 11 (stage 40 cm), the Jun. 18, 2014 (stage BBCH 60), the Jun. 25, 2014 (stage BBCH 70) and the Jul. 9, 2014 (stage BBCH 74).
At the beginning of the trial, the pressure of the late blight was significant which required the application of a synthetic fungicide, dithane (between June 1, stage 5 cm, and Jun. 7, 2014, stage 20 cm).

Then, given the less favorable weather conditions for the subsequent development of the disease, two artificial contaminations of the plot were made: the first by a suspension of spores from contaminated leaves from a pile of waste (May 30, 2014), the second on Jun. 2, 2014 by an inoculum from a laboratory (Eurofins, Loos en Gohelle). These two contaminations allowed a homogeneous pressure of late blight to be obtained on the plot.

The notations presented in FIG. 5 were performed on July 4 at stage BBCH 70 corresponding to the average number of spots per plant in the central rows. FIG. 5 shows the count of the spots appearing on the foliage of the potato plants which were or were not pre-treated with the extract of parasol mushroom (count of Jul. 4, 2014). The trial was conducted in open-field after contamination by late blight (*Phytophthora infestans*). Pre-treatment with the extract of parasol mushroom (application of the equivalent of 35 g of dry extract per hectare) reduces the symptoms associated with late blight. The number of foliage spots is reduced by an average of 39%. The extract of parasol mushroom thus showed its effectiveness in open-field in the case of average pressure in late blight.

Example 9

Efficacy of oyster mushroom extract on reducing downy mildew (*Plasmopara viticola*) symptoms in vines during open-field trials (see FIG. 6).

An open-field trial was conducted on the vine (*Vitis vinifera*, Grenache black grape) during the year 2015 in Villelongue dels monts (66, France) to determine the effectiveness of the extract of oyster mushroom as a protection against downy mildew (*Plasmopara viticola*), alone or alternately with the Bordeaux mixture (BB) (750 g Cu/ha).

On the experimental plot, 4 micro-plots per treatment condition were statistically distributed; the test was conducted under controlled conditions with artificial contamination on May 17 limited to the first strain of each elementary plot and the general humidity was maintained by regular sprinkling.
Treatments performed between May 12, 2015 and Jul. 6, 2015 at a dose of 200 L/ha are shown in Table 2. The control receives no treatment; the "copper" treatment consists in applying between May 12, 2015 and Jul. 6, 2015 the Bordeaux mixture at a dose equivalent to 750 g Cu/ha (seven applications in total). The extract of oyster mushroom EX2 is applied in the form of an aqueous solution at 35 g/ha, either alone or alternately with Bordeaux mixture (oyster mushroom extract/Cu). A modality intended to evaluate the effectiveness of treatments based on Bordeaux mixture at the same dose that the copper treatment but applied 3 times instead of 7, was also evaluated (Cu1/2).

Table 2 shows the treatment schedule for the various modalities (open field vine/mildew test).

| Treatments | Dates | May 12, 2015 | May 18, 2015 | May 28, 2015 | Jun. 5, 2015 | Jun. 16, 2015 | Jun. 26, 2015 | Jul. 6, 2015 |
|---|---|---|---|---|---|---|---|---|
| | BBCH stages | 55 | 57 | 63 | 73 | 75 | 79 | 79 |
| Control | | — | — | — | — | — | — | — |
| Copper | | BB | BB | BB | BB | BB | BB | BB |
| Oyster mushroom extract | | Ple | Ple | Ple | Ple | Ple | Ple | Ple |
| Oyster mushroom extract/Cu | | BB | Ple | BB | Ple | BB | Ple | BB |
| Cu ½ | | BB | — | BB | — | — | BB | — |

BB: Bordeaux mixture;
Ple: extract of oyster mushroom;
—: no treatment

The notations presented in FIG. 6 were carried out on July 20 at stage 81 (beginning of ripening). The frequency of attacks is estimated by the percentage of bunches attacked by the disease.

FIG. 6 shows the attacked grape surface (%) on vines after treatment (or not) with the oyster mushroom extract, as well as alternating with Bordeaux mixture (oyster mushroom extract/Cu). The trial was conducted in open-field after contamination by downy mildew (*Plasmopara viticola*). The effectiveness expressed in % of the control is indicated in the table attached to the figure.

The "sulfur" treatment consists of applying, between Apr. 14, 2015 and Jun. 26, 2015, the product sold under the trade name "Thiovit" at a dose equivalent to 8 kg/ha (eight applications in total). The extract of oyster mushroom EX2 is applied in the form of a 35 g/ha solution, either alone or alternately with the aforementioned "Thiovit" (oyster mushroom extract/sulfur). A modality intended to evaluate the treatment effectiveness based on the aforementioned product "Thiovit" at the same dose as the sulfur treatment, but applied 4 times instead of 7 was also evaluated (S1/2).

The different modalities are presented in Table 3 below.

TABLE 3

Treatment schedule for the different modalities (open-field vine/powdery mildew test)

| | | T1 | T2 | T3 | T4 | T5 | T6 | T7 | T8 |
|---|---|---|---|---|---|---|---|---|---|
| Dates | | May 12, 2015 | May 18, 2015 | May 28, 2015 | Jun. 5, 2015 | Jun. 16, 2015 | Jun. 26, 2015 | Jul. 6, 2015 | May. 26, 2015 |
| BBCH stages | | 15 | 53 | 55 | 61 | 73 | 75 | 77 | 77 |
| TREATMENTS | Control | — | — | — | — | — | — | — | — |
| | Sulfur | S | S | S | S | S | S | S | S |
| | Oyster mushroom extract | Ple | Ple | Ple | Ple | Ple | Ple | Ple | Ple |
| | Oyster mushroom/ S extract | S | Ple | S | Ple | S | Ple | S | Ple |
| | S½ | S | — | S | — | S | — | S | — |

The extract of oyster mushroom thus allows a reduction of the symptoms of attack by the mildew. The efficiency rate of 57% is not as high as that of the copper treatment (89%) used here as a fungicide. However, the alternate treatment (oyster mushroom extract/copper) has a higher level of effectiveness (82%): it therefore makes it possible to propose an effective crop protection solution allowing a reduction in the use of the fungicide. The oyster mushroom extract applied alternately with the copper shows a level of efficiency much higher (82%) than that of the 1/2 copper dose, thus confirming the stimulation of the defenses of the plant by the extract of oyster mushroom.

Example 10

Effectiveness of oyster mushroom extract on the reduction of symptoms associated with powdery mildew (*Erysiphe necator*) on vines during open-field trials (see FIG. 7).

An open-field trial was conducted on the vine (*Vitis vinifera*, Chardonnay grape variety) in 2015 in Alénya (66, France) to determine the effectiveness of the extract of oyster mushroom EX2 in protection against powdery mildew (*Erysiphe necator*), alone or alternately with Thiovit (8 kg/ha).

On the experimental plot, 4 micro-plots per treatment condition were statistically distributed;

Powdery mildew appeared relatively late on bunches after a very discrete phase on leaves. At first count on June 25 (vegetative stage BBCH 77), a correct level of disease was found in untreated control plots with 70.50% frequency and 30.25% intensity attack. At the second count on July 23 (vegetative stage BBCH 85), an attack of 77.50% in frequency and 40.60% in intensity was observed.

The treatments were carried out between Apr. 17, 2015 and Jun. 26, 2015 at a dose of 180 L/ha and are presented in Table 3. The control receives no treatment.

FIG. 7 shows the grape surface attacked (%) by powdery mildew on vines (Chardonnay grape variety) treated (or not) with the oyster mushroom extract, as well as alternately with the above-mentioned "Thiovit" product (oyster mushroom extract/S) The effectiveness is expressed in % of the control and indicated in the table attached to FIG. 7.

The extract of oyster mushroom reduces the symptoms of powdery mildew attack. The rate of effectiveness of 65% is not as high as that of the sulfur treatment (92%) used here as a fungicide. However, the alternating treatment (oyster mushroom extract/sulfur) has a higher effectiveness level (96%): it therefore makes it possible to propose an effective crop protection solution, which makes it possible to reduce the use of the fungicide. The extract of oyster mushroom applied alternately with the sulfur shows a level of effectiveness much higher (96%) than that of the 1/2 dose of sulfur (87%), thus confirming the stimulation of the defenses of the plant by the extract of oyster mushroom.

Therefore, in order to control powdery mildew or downy mildew, the fungicide/oyster mushroom extract alternate program has shown a sufficient level of protection for safe management of vine growing in the open field.

Example 11

Study showing the stimulation of defenses by the oyster mushroom extract and the button mushroom extract for Brachypodium distachyon in the presence of *Fusarium graminearum*.

A model temperate cereal plant, Brachypodium distachyon, was grown under glass and used for this test 4 weeks after sowing. A batch of 10 plants per repetition was constituted and two biological repetitions were performed.

The pretreatments consisted in applying, by spraying, the oyster mushroom extract and the button mushroom extract of Examples 2 and 3 at a concentration of 0.35 g/L, on all the ears at days 0, 2 and 5, until runoff. Inoculation of Fusarium graminearum was performed at day 7 (=mid-anthesis stage, BBCH65) by spraying all ears with a $10^5$ spore/mL spore suspension.

Plant harvests take place at t=0, t=24 h or t=48 h. Several analyses are implemented:

Fusarium wilt symptoms were observed at 10 days post-inoculation;

The fungal biomass was quantified and expressed in ng of F. graminearum genomic DNA for 10 ng of total genomic DNA (plant+fungus) determined by quantitative PCR. Specific primers of the F. graminearum TUB2 gene were used to determine the amount of fungal genomic DNA by reference to a standard range.

The expression of two B. distachyon defense genes was followed: the PAL gene encoding the phenylalanine-ammonialyase (1st enzyme in the phenylpropanoid biosynthesis pathway) and the PR9 gene encoding a pathogenesis-related protein (PR). Two reference genes were used, ACT7 and UBC18. The expression of these two genes was determined in ears treated beforehand with the extract of oyster mushroom or button mushroom against control ears, inoculated with the strain PH-1 of F. graminearum.

FIG. 8 shows the symptom notation at 10 days of post-inoculation as symptomatic spikelets. A spikelet is considered symptomatic if 50% or more of the flower cavities exhibit symptoms of Fusarium wilt. The control is an untreated ear; the ears are treated prior to the inoculation of F. graminearum with extracts of oyster mushroom or button mushroom.

The results show a significant reduction in the symptoms of Fusarium wilt on plants treated with mushroom extracts. Thus, extracts of oyster mushroom and button mushroom confer protection against B. distachyon infection by F. graminearum of 77% and 94.7%, respectively.

FIG. 9 represents the quantification of the fungal biomass expressed in ng of F. graminearum genomic DNA for 10 ng of total genomic DNA (plant+fungus) determined by quantitative PCR. Specific primers of the F. graminearum TUB2 gene were used to determine the amount of fungal genomic DNA by reference to a standard range. Asterisks indicate significantly different values of the control (Student's t-test, p-value<0.05).

Quantification of the F. graminearum biomass on the different ears indicates a negligible amount of fungal genomic DNA within the same amount of total genomic DNA (plant+fungus) on the ears pretreated with each of the two extracts by comparison. with the untreated control (FIGS. 10A and 10B).

FIGS. 10A and 10B show the relative expression of the PAL (A) and PR9 (B) genes in B. distachyon ears pretreated with the oyster mushroom extract (dot pattern bars), or the button mushroom extract (hatched bars) and inoculated with F. graminearum, then harvested 48 hours after post-inoculation. Relative expression was determined with respect to B. distachyon ears previously untreated with the extracts, using the ΔΔCt method. Two reference genes of B. distachyon, constitutively expressed were used: ACT7 and UBC18.

The results indicate that the relative expression of PAL and PR9 genes is more induced 48 hours after inoculation by F. graminearum in the ears treated with extracts of oyster mushroom and button mushroom than in non pre-treated ears (FIGS. 10A and 10B). In fact, the expression of the PAL gene is induced 5.2 times more following the application of the extract of oyster mushroom and nearly 3.5 times more following the application of the extract of button mushroom.

The results are even more pronounced for the PR9 gene which has an induction increased by 10.2 and 15.4 fold following the application of the extracts of oyster mushroom and button mushroom, respectively, compared to non pre-treated ears.

The invention claimed is:

1. An aqueous composition obtained by:
   alkaline extraction of a powder of an edible macroscopic mushroom selected from the group consisting of oyster mushrooms, parasol mushrooms, and button mushrooms;
   neutralization of the solution obtained by the alkaline extraction step with an organic or inorganic acid and separating obtained precipitate by centrifugation;
   ultrafiltration of the neutralized alkaline extract to separate acid salt(s) and simple sugars from a liquid phase;
   dilution of the liquid phase which constitutes the filtered neutralized alkaline extract;
   enzymatic hydrolysis of the diluted filtered neutralized alkaline extract with a beta-glucanase at between 10 and 65° C., wherein the hydrolysis thus performed is stopped by inactivating the beta-glucanase at a temperature above 65° C.; and
   filtration of the obtained hydrolyzate to obtain the aqueous composition in which compounds of molecular weight less than 100 kDa are isolated,
   wherein the aqueous composition comprises:
   (i) a protein content of 5 to 15% by weight relative to a total dry matter of the aqueous composition;
   (ii) a total sugar content of 60 to 80% by weight, relative to the composition's dry matter content; wherein the total sugar comprises glucans of 35-15% by weight relative to the dry matter; and monosaccharides comprising 38 to 50% by weight of glucose, 18 to 28% by weight of galactose, 20 to 30% by weight of mannose and 0.5 to 4% by weight of glucosamide and/or acetylated glucosamine; and;
   (iii) 30 to 50% by weight of a dry matter whose molecular weight is greater than 10 kDa.

2. The aqueous composition according to claim 1, wherein the alkaline extraction step is carried out at a temperature between 20 and 100° C. with an alkaline aqueous solution having a pH greater than 10, while maintaining under stirring a suspension of 5 to 15 parts by weight of the mushroom powder relative to the alkaline aqueous solution; and the neutralization of the solution obtained by the alkaline extraction step is carried out with an organic or inorganic acid.

3. The aqueous composition according to claim 1, wherein the enzymatic hydrolysis performed with the beta-glucanase is maintained for 24 hours with stirring.

4. The aqueous composition according to claim 1, wherein the concentration of the compounds of molecular weight less than 100 kDa is of 1.5 to 4.0% by weight of the filtered hydrolysate obtained.

5. The aqueous composition according to claim 1 additionally comprising at least one compatible formulation agent.

6. The aqueous composition according to claim 1, further comprising at least one anti-phytopathogenic agent selected from a fungicidal agent, an antibacterial agent, an antiviral agent, a pesticidal agent, and a biocontrol agent.

7. The aqueous composition according to claim 1 further comprising at least one nutrient for plants for simultaneous application.

* * * * *